United States Patent [19]

Barbee

[11] 4,424,242

[45] Jan. 3, 1984

[54] CONTAINERS HAVING IMPROVED GAS BARRIER PROPERTIES

[75] Inventor: Robert B. Barbee, Kingsport, Tenn.

[73] Assignee: Eastman Kodak Company, Rochester, N.Y.

[21] Appl. No.: 488,296

[22] Filed: Apr. 25, 1983

[51] Int. Cl.$^3$ .............................................. B32B 27/36
[52] U.S. Cl. ....................................... 428/35; 428/480
[58] Field of Search ................... 538/354; 428/35, 480

[56] References Cited

U.S. PATENT DOCUMENTS 3,733,309  5/1973  Wyeth et al. ........................... 428/35
3,878,284  4/1975  Schmitt et al. ....................... 528/354

*Primary Examiner*—George F. Lesmes
*Assistant Examiner*—P. R. Schwartz
*Attorney, Agent, or Firm*—David E. Cotey; Daniel B. Reece, III

[57] ABSTRACT

The present invention provides novel multilayer packaging materials having improved resistance to gas permeability. The present invention also provides containers which are formed from the novel packaging material. The multilayer packaing material comprises at least one film comprising polyglycolic acid and at least one film formed from a polyester comprising units derived from terephthalic acid and ethylene glycol. The containers which are provided by the present invention may be in the form of sheet, film, molded articles, such as bottles, and other such structures.

9 Claims, No Drawings

CONTAINERS HAVING IMPROVED GAS BARRIER PROPERTIES

BACKGROUND OF THE INVENTION

The present invention relates to packages for protecting comestibles. More specifically, it relates to films and molded containers which are formed from specified multilayer packaging materials.

Presently there is a strong interest in the packaging industry for protecting comestibles (such as foodstuffs, medicines, and especially carbonated beverages) by enveloping the substances in packages which are formed from various polymers. One polymer in which there is an especially strong interest is polyethylene terephthalate. Containers formed from this material, which may be biaxially oriented, possess many desirable characteristics. Molded biaxially oriented containers which are formed from polyethylene terephthalate and certain copolyesters are disclosed in U.S. Pat. No. 3,733,309. While molded containers formed from polyethylene terephthalate have many desirable characteristics, there is a need in the art to provide improved containers which will have gas permeabilities which are lower than those of containers formed from polyethylene terephthalate. Such improved containers would be much more versatile in their utilization and allow the containers to be used to package substances for which the polyethylene terephthalate containers may not be suitable.

The present invention provides such improved containers. The containers of the present invention are formed from a multilayer packaging material which comprises at least one layer comprising polyglycolic acid and at least one layer comprising a specified polyester.

Containers which are formed from this multilayer packaging material exhibit desirable physical properties, including improved gas barrier properties, which render them advantageous for use in the packaging of comestibles. In addition, good adherence between layers is obtained, thereby obviating the need for adhesives or tie layers.

SUMMARY OF THE INVENTION

In one aspect of the present invention, there is provided a multilayer packaging material having low gas permeability. The packaging material comprises at least one film comprising polyglycolic acid and at least one film formed from a polyester comprising units derived from terephthalic acid and ethylene glycol.

In another aspect of the present invention, there are provided containers formed from the packaging material of the present invention.

DETAILED DESCRIPTION OF THE INVENTION

The invention described herein relates to containers formed from a specified multilayer packaging material. As used herein, the term "container" is intended to mean shaped articles formed from a specified packaging material which are suitable for use in packaging comestibles. Such shaped articles include sheets and films which are formed from the material and which may be used as such or as barrier layers, container liners, etc. Such shaped articles also include molded containers, such as bottles.

The packaging material of the present invention comprises at least one film comprising polyglycolic acid and at least one film formed from a specified polyester.

Polyglycolic acid is a known polymeric material. It can be prepared, for example, by the ring-opening polymerization of glycolide using stannous octoate catalyst. This preparation is described by D. K. Gilding and A. M. Reed in *Polymer*, Vol. 20, p. 1459 (1979). Polyglycolic acid compositions which are useful in the present invention exhibit inherent viscosities of about 0.3 to 1.5 as determined as a 0.5 percent solution in hexafluoroisopropanol at 25° C.

In a similar manner, copolymers of glycolic acid which exhibit more desirable properties, such as less tendency toward rapid crystallization than the homopolymer, can be prepared. A particularly preferred copolymer is one prepared from glycolide and lactic acid wherein the lactic acid comprises up to about 30 mole percent of the polymer. Especially preferred are compositions wherein the lactic acid comprises about 10 to 20 mole percent of the copolymer.

Films which are useful in preparing the packaging material of the present invention can be formed from polyglycolic acid, or a copolymer as described above, by any convenient polymer processing techniques which are known in the art. An especially convenient technique involves pressing ground polyglycolic acid polymer at elevated temperature (e.g., about 225° C.) in an appropriate apparatus, such as a pneumatic press.

The packaging material of the present invention further comprises at least one film of a specified polyester. The polyester from which the packaging material of the present invention is formed comprises the reaction product of a diol component and a diacid component. The diacid component comprises terephthalic acid. Other well-known polyester-forming diacids may be employed in minor amounts (i.e., in amounts less than about 50 mole percent, and, preferably, less than about 10 mole percent, based on the total amount of diacid present in the polyester). Such diacids may include, for example, isophthalic acid, 1,4-cyclohexanedicarboxylic acid, linear lower alkyl dicarboxylic acids, etc. The diacid component may also include acid halides and esters, particularly the lower alkyl ($C_1$–$C_4$) esters of the acids mentioned.

The polyester further comprises a diol component. The diol component comprises ethylene glycol. Thus, in preferred embodiments, the polyester comprises polyethylene terephthalate. In other preferred embodiments, the glycol component further comprises 1,4-cyclohexylenedimethanol. An especially preferred composition utilizes a mixture of ethylene glycol and 1,4-cyclohexylenedimethanol in a molar ratio of ethylene glycol to 1,4-cyclohexylenedimethanol of about 70:30.

It is conceivable that the diol component may additionally comprise minor amounts (i.e., less than about 50 mole percent, and, preferably, less than about 10 mole percent, based on the total amount of diol present in the polyester) of other known polyester-forming diols. Such diols may include, for example, 2,4-dimethyl-2-ethylhexane-1,3-diol; 2-ethyl-2-butyl-1,3-propanediol; 2-ethyl-2-isobutyl-1,3propanediol; 2,2,4-trimethyl-1,6-hexanediol; 4,4'-sulfonyldiphenol; 4,4'-oxydiphenol; 4,4'-isopropylidenediphenol; 2,5-naphthalenediol; 1,4-butane-diol; propylene glycol; diethylene glycol; 2,2,4-trimethyl-1,3-pentanediol; 2,2-dimethyl-1,3-propanediol; 2,2-diethyl-1,3-propanediol; 2-methyl-2- propyl-1,3-propanediol; 1,3-butanediol; 1,5-pentanediol; 1,6-hexanediol; 1,2-cyclohexanedimethanol; 1,3-cyclohexanedimethanol; 2,2,4,4-tetramethyl-1,3-cyclobutanediol; o-, m-, and p-xylylene diols; etc.

The polyester which is employed in the present invention exhibits an I.V. of about 0.5 to 1.5. The I.V. is measured at 25° C. in a 60/40 by weight mixture of phenol/tetrachloroethane at a concentration of 0.5 g/100 ml. Polymers having an I.V. within the range specified above are of sufficiently high molecular weight to be used in the formation of the containers described above.

The polyesters which are employed in the present invention are synthesized by methods generally known in the art for producing polyesters. The reactants may all be reacted in a single operation or, alternatively, sequential operation may be employed. Temperatures which are suitable for forming the polyesters generally range between about 180° C. and about 295° C., with the preferred range being about 200° to 285° C. The reaction may be conducted under an inert atmosphere, such as nitrogen. Preferably, the final stage of the polyester synthesis is conducted under a vacuum.

Conventional catalysts are employed in the preparation of the polyester. For example, polymerization can be effected in the presence of catalytic amounts of transition metal compounds, such as antimony acetate, antimony trioxide, titanium alkoxides, and organo tin compounds (for example, stannous alkoxides). Preferred catalysts are titanium alkoxides, such as titanium tetraisopropoxide, titanium tetrabutoxides, etc. Usually, the catalysts will be present in an amount of about $10^{-5}$ to $10^{-3}$ moles of catalyst per mole of total acid employed.

Of course, suitable additives, such as dyes, pigments, plasticizers, fillers, antioxidants, stabilizers, etc., may be employed in conventional amounts. Such additives may be added directly to the reaction or may be added to the final polymer.

Films may be formed from the above-described polyester for inclusion in the multilayer packaging material of the present invention. Such films can be formed by conventional plastic processing techniques. For example, sheets, films, and other like structures can be formed by well-known extrusion techniques.

The packaging material of the present invention comprises at least one film comprising polyglycolic acid and at least one film formed from the polyester described above. In the preparation of such a multilayer structure, heat and pressure may be used to laminate the polyglycolic acid film to the polyester film. Another convenient technique involves melt extrusion whereby the polyglycolic acid film and the polyester film are coextruded to form the multilayer packaging material. Other known techniques for preparing a multilayer packaging material from a polyglycolic acid film and a polyester film will be apparent to the skilled artisan.

It has been observed that in the formation of multilayer packaging materials by concurrent melt extrusion of a polyglycolic acid film and a polyester film, the polyglycolic acid film crystallizes too rapidly to provide good adherence between the respective films. Under such conditions, it is desirable to employ a film formed from a copolymer of polyglycolic acid, as described above.

The packaging material described above may be formed into the containers of the present invention by conventional plastic processing techniques. For example, sheets, films, and other like structures can be formed by well-known lamination or extrusion techniques.

Film or sheet material made from the packaging material of the present invention is strong, flexible, and clear. It may be formed into articles such as wrappers, bags, and the like.

Molded containers can be made from the above-described packaging material by blow molding a coextruded "pipe" of the packaging material and by other such molding techniques, all of which are well known in the art.

The above-described containers of the present invention are ideally suited for protecting comestibles, such as foodstuffs, medicines, and like substances. The advantages of these container materials are due to low gas permeability relative to polyethylene terephthalate. Typically, the containers of the present invention exhibit an oxygen permeability of less than about 5 (preferably, less than about 3), measured as cubic centimeters permeating a 1 mil thick sample, 100 inches square, for a 24 hour period under an oxygen partial pressure difference of 1 atmosphere at 30° C.

Furthermore, the multilayer packaging material of the present invention does not require the use of adhesives, tie layers, or the like between the respective polyester and polyglycolic acid films.

This invention will be further illustrated by the following examples, although it will be understood that these examples are included merely for purposes of illustration and are not intended to limit the scope of the invention.

EXAMPLE 1

A film of polyglycolic acid was prepared by pressing ground polyglycolic acid polymer at 225° C. in a Hannifin pneumatic press. A polyglycolic acid film six mils in thickness was obtained. A sample of polyethylene terephthalate was extruded into a film measuring three mils in thickness. A four-inch square of the polyglycolic acid film was placed between two four-inch squares of the polyethylene terephthalate film. The films were pressed together at 210° C. in a Hannifin pneumatic press for ten seconds. An 11 mil laminate was formed. The oxygen permeability of the laminate was determined at 30° C. using a MOCON Oxtran 100 instrument. The results are given in Table I.

EXAMPLE 2

A six-mil polyglycolic acid film and a three-mil film of polyethylene terephthalate were prepared as described in Example 1. A four-inch square of the polyglycolic acid film and a four-inch square of the polyethylene terephthalate film were pressed together at 210° C. in a Hannifin pneumatic press for 10 seconds. A nine-mil laminate was formed. The oxygen permeability of the laminate was determined as in Example 1, and the results are given in Table I.

EXAMPLE 3

A polyester was prepared by typical polymerization techniques from terephthalic acid, ethylene glycol, and 1,4-cyclohexylenedimethanol. The molar ratio of ethylene glycol to 1,4-cyclohexylenedimethanol was 69:31. A film measuring three mils in thickness was extruded from the polyester. A three-gram sample of ground polyglycolic acid polymer was placed between two four-inch squares of the polyester film, and the films were pressed together at 225° C. in a Hannifin pneumatic press for 10 seconds. An eight-mil laminate was formed. The oxygen permeability of the laminate was determined as in Example 1, and the results are given in Table I.

COMPARATIVE EXAMPLE 1

A film was extruded from a sample of polyethylene terephthalate, and the oxygen permeability of the film was determined as in Example 1. The results are given in Table I.

COMPARATIVE EXAMPLE 2

A film was extruded from the polyester described in Example 3. The oxygen permeability of the film was determined as in Example 1, and the results are given in Table I.

TABLE I

| Example | Oxygen Permeability |
|---------|---------------------|
| 1 | 1.3 |
| 2 | 0.8 |
| 3 | 2.3 |
| Comp. Ex. 1 | 10.5 |
| Comp. Ex. 2 | 18.7 |

It can be seen from an examination of the data of Table I that the laminates representing the multilayer packaging material of the present invention provide much improved resistance to oxygen permeability over that of the polyester films described in the Comparative Examples. In addition, no adhesives or tie layers are required in order to provide a unitary structure. For these reasons, the multilayer packaging materials exemplified above are quite advantageous for use in the packaging of cosmestibles.

While the invention has been described in detail with particular reference to preferred embodiments thereof, it will be understood that variations and modifications can be effected within the spirit and scope of the invention.

I claim:

1. A multilayer packaging material having low gas permeability comprising
    (a) at least one film comprising polyglycolic acid, and
    (b) at least one film formed from a polyester comprising units derived from terephthalic acid and ethylene glycol.

2. The packaging material of claim 1 wherein said polyester comprises polyethylene terephthalate.

3. The packaging material of claim 1 wherein said polyester comprises units derived from terephthalic acid, ethylene glycol, and 1,4-cyclohexylenedimethanol.

4. The packaging material of claim 3 wherein the molar ratio of ethylene glycol to 1,4-cyclohexylenedimethanol is about 70:30.

5. The packaging material of claim 1 wherein said film comprising polyglycolic acid further comprises up to about 30 mol percent lactic acid.

6. The packaging material of claim 5 wherein said film comprising polyglycolic acid further comprises about 10 to 20 mole percent lactic acid.

7. A container formed from the packaging material of claim 1.

8. A laminated film formed from the packaging material of claim 5.

9. A molded container formed from the packaging material of claim 6.

* * * * *